Figure 5:
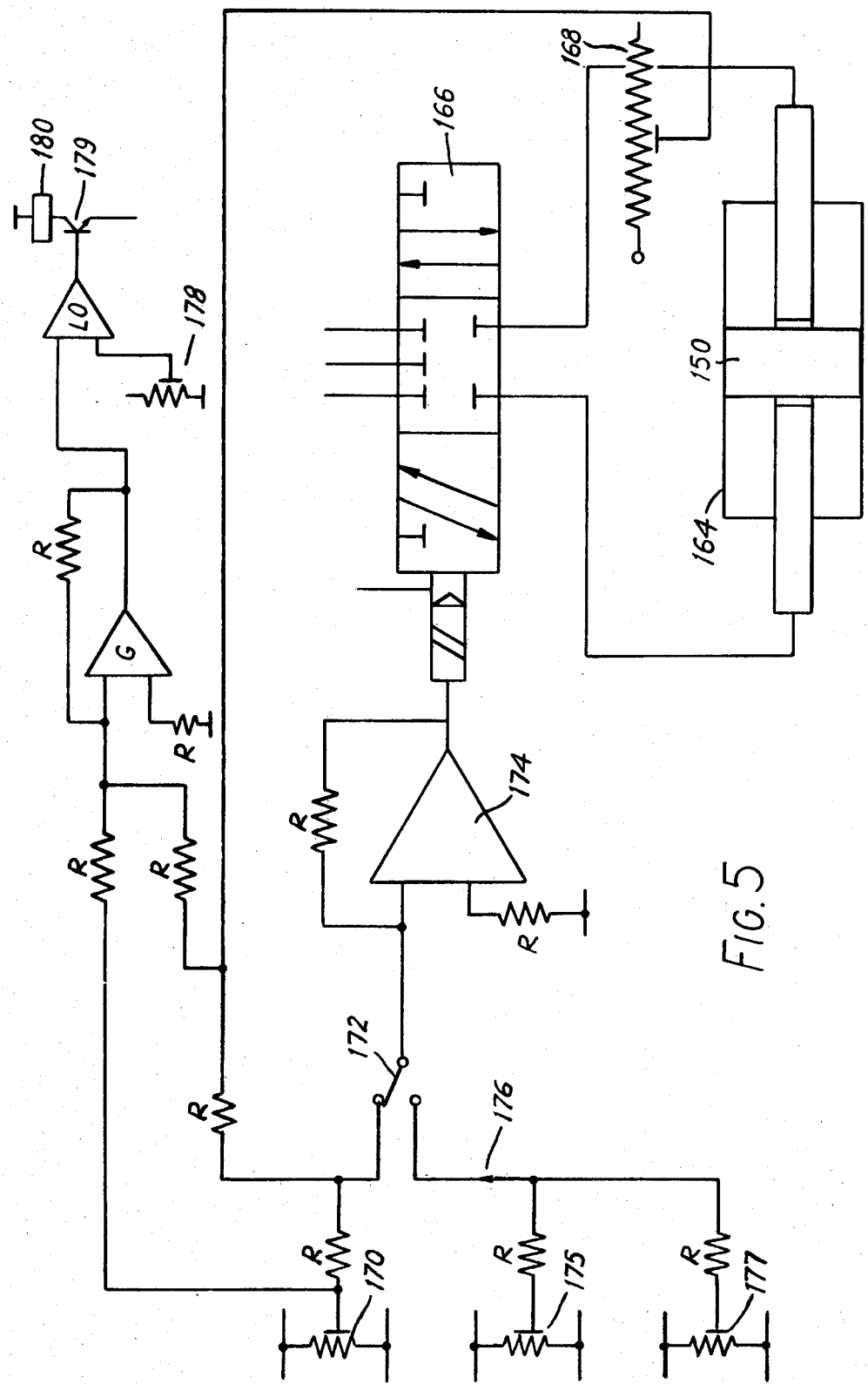

United States Patent [19]

Baker

[11] 4,188,522

[45] Feb. 12, 1980

[54] METHOD OF MACHINING A WORKPIECE TO A PREDETERMINED DEPTH USING A MACHINING PROCESS IN WHICH MACHINE TOOL WEAR OCCURS

[75] Inventor: George E. Baker, Ashfordby, near Melton Mowbay, England

[73] Assignee: Amchem Company Limited, Sileby, England

[21] Appl. No.: 851,788

[22] Filed: Nov. 15, 1977

Related U.S. Application Data

[63] Continuation-in-part of Ser. No. 739094, Nov. 5, 1976, abandoned.

[30] Foreign Application Priority Data

Nov. 6, 1975 [GB] United Kingdom ............... 46117/75

[51] Int. Cl.² ............................................. B23P 1/00
[52] U.S. Cl. .............................. 219/69 M; 219/69 E
[58] Field of Search ................ 219/69 E, 69 M, 69 G, 219/69 V, 69 R, 69 C, 131 F; 204/224 M, 129.55; 279/102; 408/18; 51/98 SP, 105 SP, 165.93

[56] References Cited

U.S. PATENT DOCUMENTS

| 1,896,533 | 2/1933 | Vuilleumier | 51/105 SP |
|---|---|---|---|
| 3,171,234 | 3/1965 | Hill | 51/105 SP |
| 3,177,337 | 4/1965 | Kohles | 219/69 E |
| 3,398,253 | 8/1968 | Rye | 219/69 M |
| 3,601,572 | 8/1971 | Check et al. | 219/69 V |
| 3,688,074 | 8/1972 | Stirner | 219/69 G |
| 3,729,609 | 4/1973 | Check et al. | 219/69 G |
| 3,774,104 | 12/1973 | Bell | 219/69 G |
| 3,798,840 | 3/1974 | Robillard et al. | 51/165.93 |
| 3,941,970 | 3/1976 | Grow | 219/69 R |

Primary Examiner—Elliot A. Goldberg
Assistant Examiner—Clifford C. Shaw
Attorney, Agent, or Firm—Charles E. Brown

[57] ABSTRACT

A method of machining a workpiece to a predetermined depth using an electrode machining discharge apparatus including electrodes which wear during the machining process. The machining of a workpiece to a first level is effected, after which the electrodes are withdrawn and a refeed member having a surface matching that of the workpiece is positioned for engagement with the electrodes, followed by the electrodes engaging the refeed member to align the ends thereof, after which the machining operation continues. The machining operations are in increments less than the depth to which the machining is to be effective, and several alignments of the electrodes may be required.

5 Claims, 6 Drawing Figures

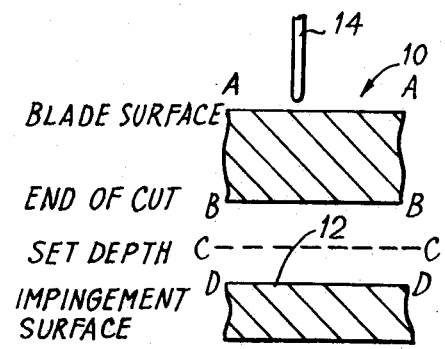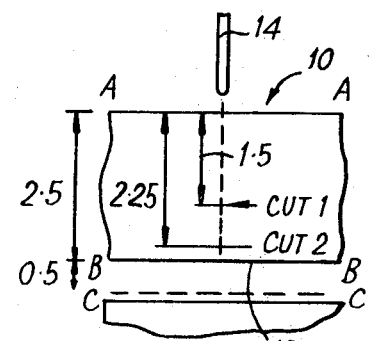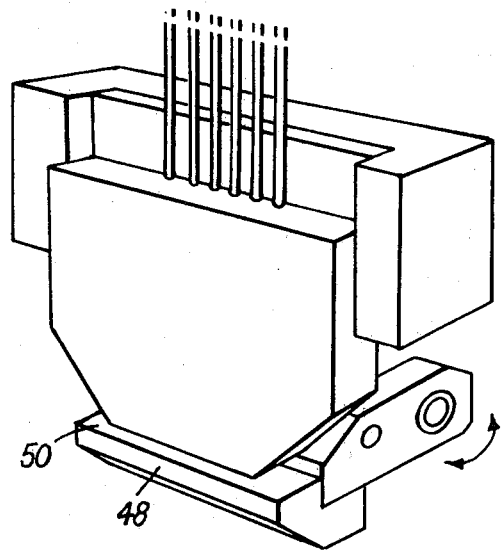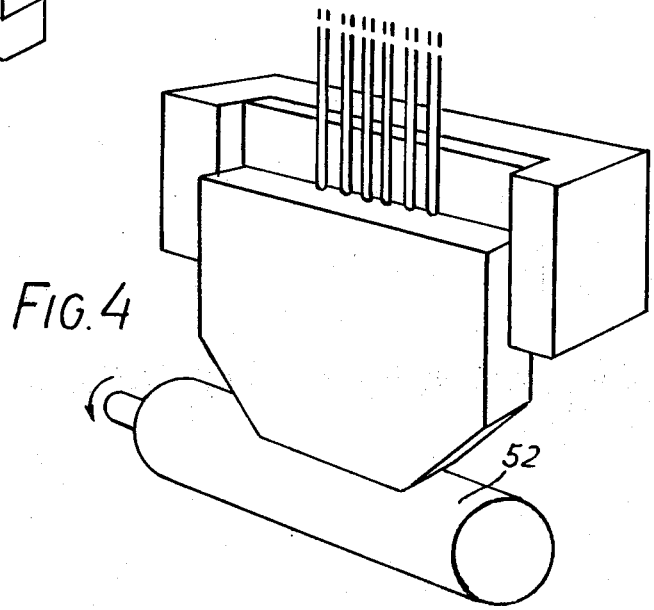

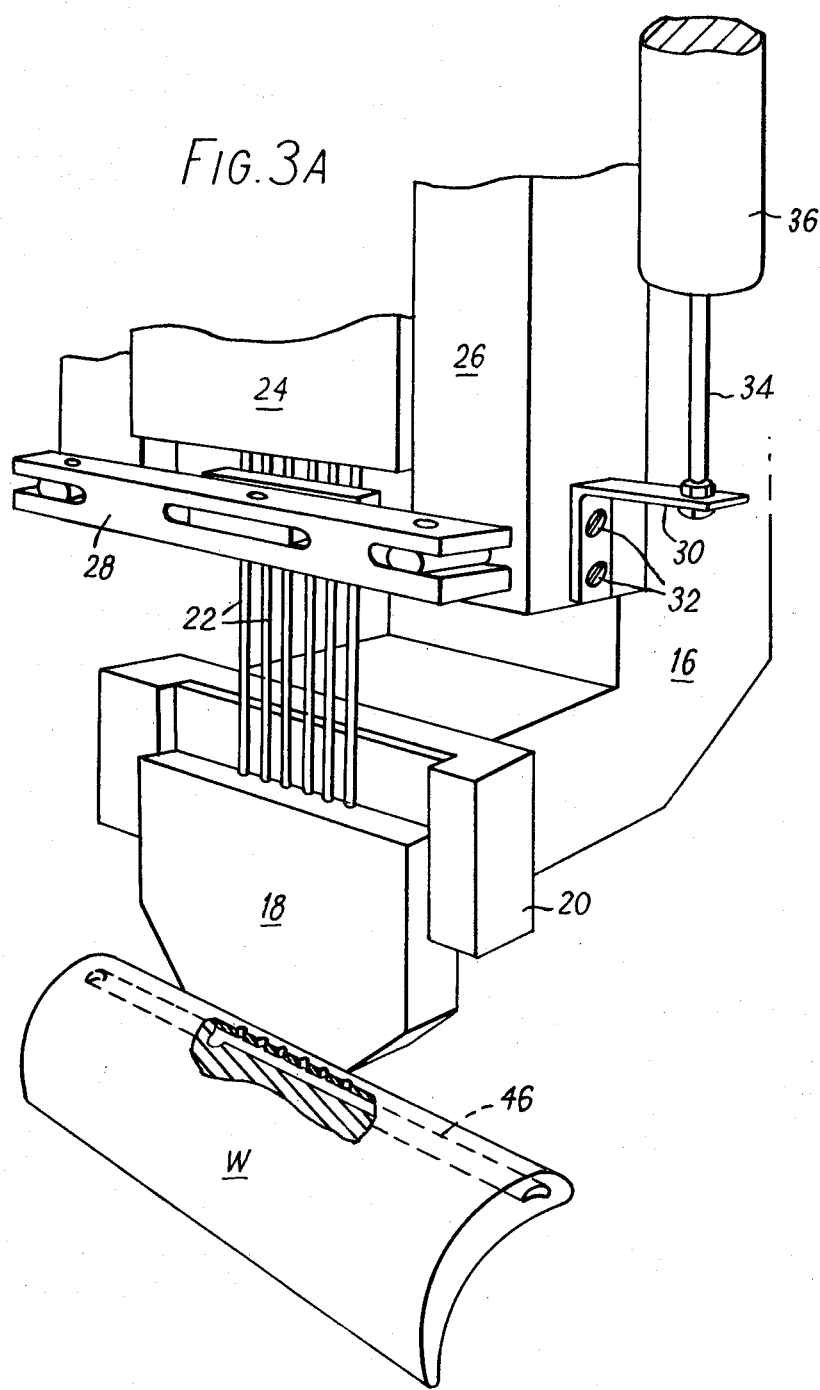

METHOD OF MACHINING A WORKPIECE TO A PREDETERMINED DEPTH USING A MACHINING PROCESS IN WHICH MACHINE TOOL WEAR OCCURS

This application is a continuation-in-part of U.S. patent application Ser. No. 739,094 filed Nov. 5, 1976 abandoned.

The present invention relates to a method of machining a workpiece to provide said workpiece with one or more bores of a predetermined depth, and in particular to such a method in which the bore or bores are to intersect a cross-bore.

Hitherto, the problem of machining, for example by electrical discharge machining one or more bores into a workpiece to meet an existing bore, has been difficult because the electrode or electrodes machining the bore or bores have tended to impinge upon the wall of the existing bore, this phenomena being known as "back wall impingement." Back wall impingement has been particularly troublesome where the diameter of the bores concerned has been a few thousandths of an inch.

In the manufacture of turbine blades for jet engines for example, a plurality of electrical discharge machining electrodes are used to machine through the turbine blade towards a cross-bore but, during the working passage of the electrodes through the blade, wear has occurred at the electrode tips causing the electrodes to wear unevenly. Thus, the longer electrodes, i.e. those which have worn least, have tended to break through into the cross-bore prior to the shorter electrodes, and continued machining to cause the shorter electrodes to break into the cross-bore has caused the longer electrodes to back wall impinge upon the wall of the cross-bore. Since the tip of an electrode is generally torpedo-shaped, however, it is necessary for the electrode tip to enter the cross-bore so as to machine the bore out completely without any necking-down adjacent the cross-bore.

In the Applicant's co-pending U.S. Pat. application Ser. No. 731,571, filed Oct. 12, 1976, now U.S. Pat. No. 4,121,081 there is described a method of re-feeding one or more electrodes which comprises locating the or each electrode in a cartridge spaced from a nose guide of the apparatus, releasably clamping the or each electrode in said cartridge with part of the length thereof supported in the nose guide, the step of releasing said clamp and said cartridge thereto whilst retaining frictional contact upon said electrodes in such a manner as to allow the or each electrode to be slidably received back in said cartridge upon the tips of the electrodes striking a workpiece and reclamping said clamp.

In accordance with the present invention therefore there is provided a method of machining a workpiece to a predetermined depth using a machining process in which machine tool wear occurs, which method comprises setting the tool for movement to the predetermined depth, machining said workpiece to a first level less than the predetermined depth to which the tool is to progress, withdrawing said tool from said workpiece, refeeding said tool by the steps of inserting a refeed member having a surface matched to that of a workpiece being over a bore being machined into the workpiece by the machine tool, aligning the machine tool on said surface of the refeed member, clamping the tool in the aligned position, raising the tool on a machine head and removing the refeed member, machining the workpiece to a second level less than said predetermined depth, refeeding said tool and continuing machining until the predetermined depth has been achieved.

In one embodiment of the invention the machining process is electrical discharge machining but it will be appreciated that the method may equally be applied to any process using electrodes for example and wherein electrode tip wear occurs during machining.

Where an electrical discharge machining apparatus is used it is conveniently of the form described in the Applicant's co-pending U.S. patent application Ser. No. 731,571. The levels may be set manually using a position transducer, the electrical signal derived from the transducer when a level has been reached being used to retract the head of the electrical discharge machining apparatus. Where a plurality of identical workpieces are to be machined the required level may be reset automatically following each machining operation.

The refeed member may be provided by a rigid block.

The refeed member may instead be provided by a grinding wheel. This is especially desirable if the electrodes during machining, become pointed due to uneven wear.

Alternatively the electrodes may be refed onto a grinding wheel before being again refed on to a refeed member having a surface matched to that of the workpiece.

The invention will now be described further by way of example with reference to the accompanying drawings in which:

FIG. 1 shows diagrammatically and in section part of a turbine blade for a jet engine, FIG. 2 shows the position of an electrode during a number of machining operations on the turbine blade of FIG. 1, FIG. 3A is a perspective view of the relevant portion of an electrical discharge machining apparatus showing diagrammatically the method of machining in accordance with the present invention with the electrodes in a machining position, FIG. 3B illustrates part of the apparatus shown in FIG. 3A with the electrodes in a refeed position, and, FIG. 4 is a perspective view of an electrical discharge machining apparatus similar to that shown in FIG. 3B except that a grinding wheel is shown as a refeed member.

FIG. 5 illustrates an electrical circuit suitable for use with the method of the invention and in the apparatus of FIG. 3A.

In FIG. 1 part of a turbine blade is shown generally as 10 having a cross-bore 12 therethrough. One electrode of an electrical discharge machining apparatus is designated 14 and is to machine a substantially vertical bore which is to intersect the bore 12 without imparting back wall damage thereto.

The electrode 14 is mounted in an electrical discharge machining (E.D.M.) apparatus as described in the Applicant's co-pending U.S. patent application Ser. No. 731,571.

On the first E.D.M. operation, a depth stop such as a position transducer (not shown on FIGS. 1 and 2) which is secured to a machine frame is set to the position shown as CC and holes drilled by the electrode 14, but due to electrode wear the depth stop is actuated by the electrode carriage before breakthrough occurs. The E.D.M. head is then retracted and the electrodes are levelled up by refeeding onto a refeed member 48, as shown in FIG. 3B such as a plate inserted under the nose guide parallel to DD (breakthrough surface).

The electrode head now feeds down and E.D.M. drilling commences and continues once again until the depth stop is actuated at the position shown as CUT 2 when the head is again retracted and the electrodes refed once more. As no wear takes place in the already drilled part of the hole, the electrodes extend the holes to a greater depth before the depth stop is actuated. However, no electrode can go beyond CC (depth stop limit). The cycle is repeated until all holes are drilled to full depth and as no electrode can go beyond CC (depth stop limit), no back wall impingement occurs.

A turbine blade with typical settings for the refeed operation is shown in FIG. 2. Assuming 50% wear ratio, with the depth stop set at 3.0 mm, the holes will be 1.5 mm deep when depth stop is reached on the initial run. On the second run the holes will 2.25 mm deep and on the third run the holes will be cleared.

To detect that machining is complete a timer is used to measure the E.D.M. drilling time. When all holes are completely through and the electrodes are refed, then on commencing another cycle, the depth stop is actuated virtually immediately after start of machining, once the machining cycle is below a present level the cycle is complete.

In FIG. 3A a workpiece W in the form of a turbine blade for an aircraft engine is clamped below the head of an E.D.M. apparatus such as that disclosed in the Applicant's above-referred-to pending applications. The head includes a frame 16 which mounts an electrode nose guide 18 in a grooved retaining member 20 therefor. The free ends of a plurality of electrodes 22 are guided by the nose guide, the electrodes themselves being carried in a cartridge 24 which is itself removably mounted in a slide member 26. An electrode clamp arm 28 serves to selectively control the positions of the electrodes 22 within the cartridge 24 in manner described in the Applicant's prior pending application Ser. No. 731,571.

A generally L-shaped bracket 30 is fixedly secured to the member 26 by screws 32. The free arm of the bracket fixedly mounts a rod 34 which is connected to the piston (not shown) of a position transducer 36. The transducer 36 is mounted upon a remote part (not shown) of the frame 16, movement of the slide member 26 relative to the frame member 16 both during a refeeding operation and during machining proper, creating an electrical signal which is used in a manner to be described hereinafter.

At the moment an operator initiates the refeed operation the clamp pad 28 is released and the electrodes are held in the cartridge solely by the friction between their surfaces and the cartridge.

FIG. 4 shows E.D.M. apparatus as shown in FIGS. 3A and 3B except that the refeed member 48 in FIG. 3B is replaced by a rotating grinding wheel 52 by means of which tips of all the electrodes are ground substantially level.

The basic circuitry for operating the apparatus shown in FIGS. 3A, 3B and 4 is shown in FIG. 5.

The operator starts the refeed operation by setting a timer (not shown) to refeed a first voltage from a motorised potentiometer 170 for a fixed time period, the said first voltage increasing at a fixed rate. The timer is set with a time period chosen to give sufficient time for a length of electrode corresponding to a length of electrode worn away in the most worn electrode to be received back into the cartridge so that after refeeding the electrodes will all be of the desired length.

The first voltage is added to a second voltage of opposite polarity, derived from a positional transducer 168. The resultant of these two voltages is fed to an input of an amplifier 174. An output of the amplifier 174 is fed to a servo valve 166 which lowers a cylinder to which the cartridge is attached relative to a piston fixed to a frame portion of the E.D.M. apparatus, thereby also lowering the cartridge. The positional transducer 168 is physically linked to the said cylinder, and therefore movement of the cylinder causes a corresponding change in the second voltage derived from the positional transducer. The cylinder therefore moves steadily downward as the first voltage increases and at any given instant the first and second voltages will be substantially equal and opposite: if this were not the case then the cylinder would move until this was the case.

During the downward movement of the cylinder the electrodes abut a surface 50 of the refeed member 48 as shown in FIG. 3B and the least worn electrodes are received back into the cartridge until the electrodes are all of the correct length relative to one another.

When the fixed time period set up on the timer has elapsed the following operations are made:
1. Movement of the motorised potentiometer is stopped and this thereafter gives a constant voltage output,
2. the clamp pad 28 is secured to clamp the electrodes in the cartridge,
3. the relay 172 is changed over so that amplifier 174 is fed from voltage source 176, the refeed member 48 is removed and the cylinder moves down towards the workpiece,
4. electrical power is fed to the electrodes.

During machining the cylinder, together with the cartridge, moves steadily downwards under the influence of the servo valve which is fed from the amplifier 174.

The amplifier 174 is itself fed from the voltage source 176 which is the resultant of two voltages i.e. the electrode voltage 175 and a feed voltage 177. The feed voltage 177 is opposite in polarity to the electrode voltage 177 and smaller in magnitude so that normally the resultant is the same polarity as the electrodes voltage. If, however, the electrode shorts on the workpiece the electrode voltage becomes zero and the resultant i.e. the voltage source 176 becomes equal to the feed voltage. The cylinder is raised until the electrode short is stopped whereupon the electrode voltage is restored and machining continues with downward movement of the electrode, until another electrode short occurs when the procedure is repeated.

Parts of the circuitry described in the foregoing description are substantially the same as those described in my U.S. patent application Ser. No. 731,571, and similar labels have been used for similar parts of the apparatus.

The first and second voltages are each also fed as an input A to a summing gate 6 and the resultant sum is fed to an input of a level detector LD. Another input B of the level detector LD is fed with a voltage derived from a pre-set potentiometer 178.

The level detector gives an output via a semiconductor 179 to a relay 180 when the voltage on input A becomes greater than the present voltage fed to input B.

The relay 180, when fed with the output from the level detector operates to stop machining and institute the refeed cycle.

When it is desired to machine a hole through to a bore the position of which is not accurately known, the depth of material between the outside surface and the bore is estimated, underestimating if any doubt exists. The estimated depth is set up as a corresponding voltage on the pre-set potentiometer 178. Machining is effected until a hole has been machined to this depth as hereinbefore described refeeding as many times as is necessary. When a hole of the depth estimated has been machined the pre-set potentiometer is readjusted to give a voltage corresponding to a machining depth greater than the previous depth by a small amount typically 0.005 inches. The said small amount chosen to be smaller than the height of the bore at the point of machining. Machining is recommenced and if the hole was blind after machining the first estimated depth, further machining will be effected.

If however breakthrough had occurred then the additional 0.005 inch will be achieved immediately since no material was present for machining. If the latter was the case the machining is complete. If however the former was the case then the pre-set potentiometer is again readjusted followed by further machinings. This is repeated until breakthrough occurs.

The resistors shown as R in FIG. 5 are all for matching, buffering or feedback purposes and their value depends upon the actual components used and can be determined in known manner.

What we claim is:

1. A method of machining a workpiece to a predetermined depth using an electrical discharge machining process in which machine tool wear occurs and wherein said machine tool includes a plurality of electrodes, said method comprising utilizing the machine tool machining a workpiece to a first level less than a predetermined depth to which the machine tool is to progress, withdrawing the machine tool from the workpiece, refeeding the machine tool by the steps of inserting a refeed member having a surface matched to that of the workpiece being machined over a bore being machined into the workpiece by each electrode, aligning the electrodes on the surface of the refeed member, clamping each electrode in the aligned position, raising each electrode on a machine head and removing the refeed member, machining the workpiece to a second level, and repeating the refeeding of the electrodes until the predetermined depth has been achieved.

2. A method of machining a workpiece to a predetermined depth according to claim 1 wherein the refeed member is a grinding wheel.

3. A method of machining a workpiece to a predetermined depth according to claim 1 wherein the method includes the additional step of refeeding the said tool on to a grinding wheel prior to refeeding said tool on to the said refeed member.

4. A method as claimed in claim 1 which includes mounting each electrode in an electrode-carrying head, setting the first level and thereafter the second levels on a position transducer, utilizing an electrical signal derived from the transducer when a set level has been reached to initiate retraction of the electrode-carrying head of the electrical discharge machining apparatus.

5. A method as claimed in claim 4 in which a plurality of identical workpieces are to be machined and said method includes the additional step of resetting automatically at least the first level following each complete machining operation of a workpiece.

* * * * *